United States Patent
Li et al.

(10) Patent No.: US 12,169,916 B2
(45) Date of Patent: Dec. 17, 2024

(54) SYSTEM AND METHOD FOR IMAGE INPAINTING BASED ON LAYOUT-GUIDED PRE-PROCESSING ATTENTION MECHANISM

(71) Applicant: Samsung Electronics Co., Ltd., Suwon-si (KR)

(72) Inventors: Wenbo Li, Santa Clara, CA (US); Hongxia Jin, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 139 days.

(21) Appl. No.: 17/503,169

(22) Filed: Oct. 15, 2021

(65) Prior Publication Data
US 2022/0156896 A1    May 19, 2022

Related U.S. Application Data

(60) Provisional application No. 63/115,428, filed on Nov. 18, 2020.

(51) Int. Cl.
*G06T 5/77* (2024.01)
*G06T 5/50* (2006.01)
*G06T 5/75* (2024.01)

(52) U.S. Cl.
CPC .......... *G06T 5/77* (2024.01); *G06T 5/50* (2013.01); *G06T 5/75* (2024.01)

(58) Field of Classification Search
CPC .......... G06T 5/005; G06T 5/004; G06T 5/50; G06T 2207/20081; G06T 2207/20084
See application file for complete search history.

(56) References Cited

U.S. PATENT DOCUMENTS

| 8,867,794 B2 | 10/2014 | Huang et al. |
| 9,305,360 B2 | 4/2016 | Parfenov et al. |
| 10,290,085 B2 | 5/2019 | Lin et al. |

(Continued)

FOREIGN PATENT DOCUMENTS

| KR | 10-2091860 B1 | 3/2020 |
| WO | 2020101246 A1 | 5/2020 |

OTHER PUBLICATIONS

Zili Yi, Qiang Tang, Shekoofeh Azizi, Daesik Jang, Zhan Xu, "Contextual Residual Aggregation for Ultra High-Resolution Image Inpainting", 2020 CVF Conference on Computer Vision and Pattern Recognition (CVPR), pp. 7505-7514, Jun. 2020; hereafter referred to as Yi (Year: 2020).*

(Continued)

*Primary Examiner* — Ping Y Hsieh
*Assistant Examiner* — Vaisali Rao Koppolu

(57) ABSTRACT

An inpainting method includes obtaining an image including an object having a delicate shape and identifying a target region within the image, where the target region is adjacent to the object. The method also includes using a first mask to separate the image into a number of semantic categories and aggregating neighboring contexts for the target region based on the semantic categories. The method further includes restoring, based on the aggregated contexts, textures in the target region without affecting the delicate shape of the object. In addition, the method includes displaying a refined image including the restored textures in the target region and the object.

20 Claims, 7 Drawing Sheets

(56) References Cited

U.S. PATENT DOCUMENTS

| | | | |
|---|---|---|---|
| 10,878,575 | B2 | 12/2020 | Lin et al. |
| 10,909,700 | B2 | 2/2021 | Lim et al. |
| 10,922,793 | B2 | 2/2021 | Baek et al. |
| 11,042,969 | B2* | 6/2021 | Amirghodsi .............. G06T 7/11 |
| 11,328,392 | B2* | 5/2022 | Bai ......................... G06T 5/005 |
| 2013/0129233 | A1* | 5/2013 | Schiller ............ G06F 18/24155 |
| | | | 382/228 |
| 2018/0158178 | A1* | 6/2018 | Lee ......................... G06T 5/005 |
| 2019/0355102 | A1* | 11/2019 | Lin ...................... G06F 18/213 |
| 2020/0242771 | A1 | 7/2020 | Park et al. |
| 2020/0372619 | A1* | 11/2020 | Amirghodsi .............. G06T 7/90 |
| 2021/0097691 | A1* | 4/2021 | Liu ..................... G06V 10/764 |
| 2021/0125313 | A1* | 4/2021 | Bai ...................... G06F 18/251 |
| 2021/0158491 | A1 | 5/2021 | Li et al. |
| 2021/0342984 | A1* | 11/2021 | Lin .......................... G06T 5/50 |
| 2022/0114698 | A1* | 4/2022 | Liu .......................... G06T 3/04 |

OTHER PUBLICATIONS

Yi et al., "Contextual Residual Aggregation for Ultra High-Resolution Image Inpainting", 2020 IEEE/CVF Conference on Computer Vision and Pattern Recognition (CVPR), May 2020, 22 pages.

Hong et al., "Deep Fusion Network for Image Completion", Association for Computer Machinery, Multimedia Conference, Apr. 2019, 13 pages.

Xie et al., "Image Inpainting with Learnable Bidirectional Attention Maps", 2019 IEEE/CVF International Conference on Computer Vision (ICCV), Oct. 2019, 18 pages.

Yu et al., "Free-Form Image Inpainting with Gated Convolution", 2019 IEEE/CVF International Conference on Computer Vision (ICCV), Oct. 2019, 17 pages.

Zeng et al., "High-Resolution Image Inpainting with Iterative Confidence Feedback and Guided Upsampling", 2020 European Conference on Computer Vision (ECCV), Jul. 2020, 17 pages.

International Search Report and Written Opinion of the International Searching Authority regarding International Patent Application No. PCT/KR2021/017024 dated Feb. 23, 2022, 10 pages.

Yi et al., "Contextual Residual Aggregation for Ultra High-Resolution Image Inpainting", 2020 IEEE/CVF Conference on Computer Vision and Pattern Recognition (CVPR), Jun. 2020, pp. 7505-7514.

Zhou et al., "Mask-Guided Region Attention Network for Person Re-Identification", Pacific-Asia Conference on Knowledge Discovery and Data Mining (PAKDD 2020), May 2020, pp. 286-298.

\* cited by examiner

SYSTEM AND METHOD FOR IMAGE INPAINTING BASED ON LAYOUT-GUIDED PRE-PROCESSING ATTENTION MECHANISM

CROSS-REFERENCE TO RELATED APPLICATION AND PRIORITY CLAIM

This application claims priority under 35 U.S.C. § 119(e) to U.S. Provisional Patent Application No. 63/115,428 filed on Nov. 18, 2020, which is hereby incorporated by reference in its entirety.

TECHNICAL FIELD

This disclosure relates generally to imaging systems. More specifically, this disclosure relates to a system and method for image inpainting based on a layout-guided pre-processing attention mechanism.

BACKGROUND

Mobile electronic devices, such as smartphones and tablet computers, have become the most prevalent device type for capturing, uploading, and sharing digital images. In many instances, users wish to edit their digital images before uploading or sharing. This is often due to difficulty in capturing "perfect" digital images (as judged by the users) at manageable time costs. Unwanted object removal or other unwanted content removal is one type of editing function that users typically wish to perform prior to uploading or sharing digital images. For example, users may wish to remove unwanted people or other unwanted objects from digital images. To perform unwanted content removal, a user may typically identify a region of a digital image in which at least one object is to be removed and replaced. A convolution neural network is then used to fill replacement content into that region, where the replacement content is typically based on other content remaining within the digital image. Unfortunately, convolution neural networks often produce poor results when filling replacement content into regions in which unwanted content is being removed. For instance, convolution neural networks often generate visible artifacts in the edited digital images.

SUMMARY

This disclosure relates to a system and method for image inpainting based on a layout-guided pre-processing attention mechanism.

In a first embodiment, an electronic device includes a display and at least one processor. The at least one processor is configured to obtain an image including an object having a delicate shape and identify a target region within the image, where the target region is adjacent to the object. The at least one processor is also configured to use a first mask to separate the image into a number of semantic categories and aggregate neighboring contexts for the target region based on the semantic categories. The at least one processor is further configured to restore, based on the aggregated contexts, textures in the target region without affecting the delicate shape of the object. In addition, the at least one processor is configured to cause the display to display a refined image including the restored textures in the target region and the object.

In a second embodiment, an inpainting method includes obtaining an image including an object having a delicate shape and identifying a target region within the image, where the target region is adjacent to the object. The method also includes using a first mask to separate the image into a number of semantic categories and aggregating neighboring contexts for the target region based on the semantic categories. The method further includes restoring, based on the aggregated contexts, textures in the target region without affecting the delicate shape of the object. In addition, the method includes displaying a refined image including the restored textures in the target region and the object.

In a third embodiment, a non-transitory computer readable medium contains instructions that when executed cause at least one processor to obtain an image including an object having a delicate shape and identify a target region within the image, where the target region is adjacent to the object. The medium also contains instructions that when executed cause the at least one processor to use a first mask to separate the image into a number of semantic categories and aggregate neighboring contexts for the target region based on the semantic categories. The medium further contains instructions that when executed cause the at least one processor to restore, based on the aggregated contexts, textures in the target region without affecting the delicate shape of the object. In addition, the medium contains instructions that when executed cause the at least one processor to display a refined image including the restored textures in the target region and the object.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a gaming console (such as an XBOX, PLAYSTATION, or NINTENDO), a smart speaker or speaker with an integrated digital assistant (such as SAMSUNG GALAXY HOME, APPLE HOMEPOD, or AMAZON ECHO), an electronic dictionary, an electronic key, a camcorder, or an electronic picture frame.

Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
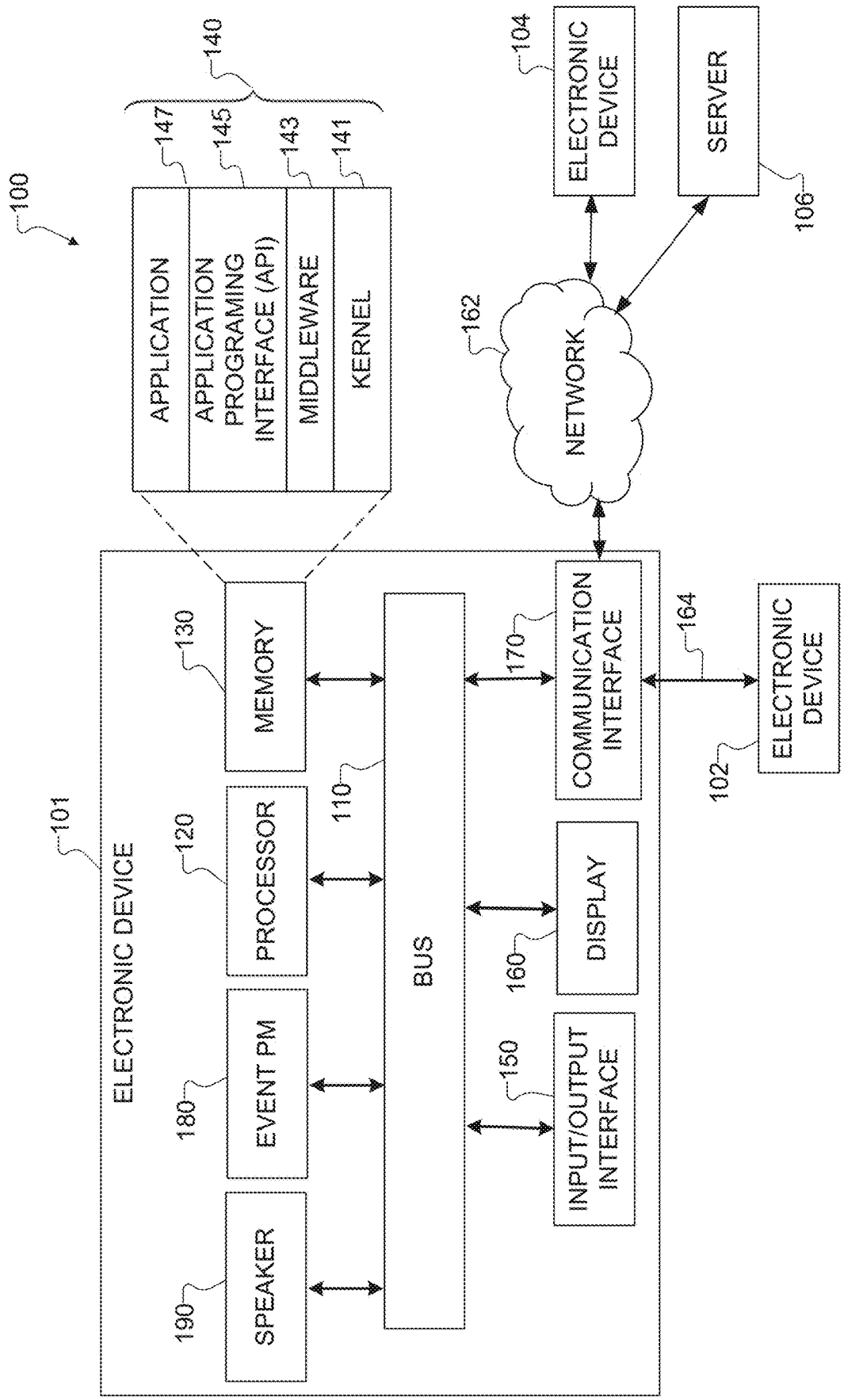
FIG. 1 illustrates an example network configuration including an electronic device in accordance with this disclosure.

FIGS. 1 through 7, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, mobile electronic devices, such as smartphones and tablet computers, have become the most prevalent device type for capturing, uploading, and sharing digital images. In many instances, users wish to edit their digital images before uploading or sharing. This is often due to difficulty in capturing "perfect" digital images (as judged by the users) at manageable time costs. Unwanted object removal or other unwanted content removal is one type of editing function that users typically wish to perform prior to uploading or sharing digital images. For example, users may wish to remove unwanted people or other unwanted objects from digital images. To perform unwanted content removal, a user may typically identify a region of a digital image in which at least one object is to be removed and replaced. A convolution neural network (CNN) is then used to fill replacement content into that region, where the replacement content is typically based on other content remaining within the digital image. Unfortunately, convolution neural networks often produce poor results when filling replacement content into regions in which unwanted content is being removed. For instance, convolution neural networks often generate visible artifacts in the edited digital images.

One reason why a convolution neural network often produces poor results during unwanted content removal is that the convolution neural network typically processes pixels of a digital image within a moving window of fixed size, and it is relatively common for a moving window within a digital image to encompass pixels of different semantic classes. A "semantic class" refers to a specific type or class of image data that might be present in an image, such as image data related to the ground, water, the sky, grass, or mountains. A digital image of a complicated or mixed scene commonly contains image data of multiple semantic classes. When a moving window includes pixels of multiple semantic classes, a convolution neural network attempts to use all of those pixels as contextual information when generating replacement content for a removed object. Some of the contextual information in the window should be used, but other contextual information (referred to as "disturbing" contextual information) should not be used. However, the convolution neural network may be unable to selectively utilize the correct semantic class or classes and disregard the incorrect semantic class or classes when generating the replacement content for a removed object. As a result, the convolution neural network may generate ambiguity artifacts because the convolution neural network is not able to apply only the correct semantic class(es) that should be used to generate the replacement content for the removed object.

Removing an object from an image can result in a hole remaining on the image plane. In certain instances, a mixed scene is created in which the hole is left adjacent to an object with a delicate shape in the image. Image inpainting may be performed to restore the hole in the image. Image inpainting covers a wide range of applications, from restoration of damaged paintings and photographs to the removal or replacement of selected objects within the image. Inpainting an image includes restoring textures for corrupted image regions with non-corrupted regions as contexts. Certain academic and industrial inpainting methods are unable to handle the mixed scenes well because a delicate shape of a nearby object cannot be well-preserved. In some cases, a layout mask may be used to guide the inpainting process in order to preserve delicate shapes of objects in mixed scenes, where the layout mask separates the image plane into several object categories. The hole regions of a specific object category can only be inpainted using non-hole regions of the same object category.

This disclosure provides techniques for performing content removal using an artificial intelligence (AI) agent that supports inpainting of images. As described in more detail below, these techniques utilize a layout-guided preprocessing model to fill-in holes in images according to local corresponding non-hole regions. For example, one or more raw textures can be generated according to the layout guidance. In some embodiments, the preprocessing model is non-parametric. Also, various embodiments of this disclosure utilize a layout-guided refinement model to refine textures through the layout-guided attention mechanism. For instance, the layout-guided attention mechanism in the model may enable an effective sampling over globally-relevant contexts. In this way, the described techniques are able to perform image inpainting with fewer/no artifacts. Embodiments of the present disclosure enable AI system to remove objects from an image, even when the object is adjacent to another object having a delicate shape, while preserving the shape of the adjacent object. The system provides the advantages of using a mask to separate the image into a number of semantic categories; aggregates neighboring contexts for the target region based on the semantic categories; and restores, based on the aggregated contexts, textures in the target region without affecting the delicate shape of the object. By using the mask and aggregated contexts, the AI system is able to avoid erosion or dilation of the delicate shape of the adjacent object.

FIG. 1 illustrates an example network configuration 100 in accordance with this disclosure. The embodiment of the network configuration 100 shown in FIG. 1 is for illustration only. Other embodiments could be used without departing from the scope of this disclosure. As shown in FIG. 1, according to embodiments of this disclosure, an electronic device 101 is included in the network configuration 100. The electronic device 101 may include at least one of a bus 110, a processor 120, a memory 130, an input/output (I/O) interface 150, a display 160, a communication interface 170, or an event processing module 180. In some embodiments, the electronic device 101 may exclude at least one of the components or may add another component.

The bus 110 may include a circuit for connecting the components 120-180 with one another and transferring communications (such as control messages and/or data) between the components. The processor 120 may include one or more of a central processing unit (CPU), an application processor (AP), or a communication processor (CP). The processor 120 may perform control on at least one of the other components of the electronic device 101 and/or perform an operation or data processing relating to communication.

The memory 130 may include a volatile and/or non-volatile memory. For example, the memory 130 may store commands or data related to at least one other component of the electronic device 101. According to embodiments of this disclosure, the memory 130 may store software and/or a program 140. The program 140 may include, for example, a kernel 141, middleware 143, an application programming interface (API) 145, and/or an application program (or "application") 147. At least a portion of the kernel 141, middleware 143, or API 145 may be denoted an operating system (OS).

The kernel 141 may control or manage system resources (such as the bus 110, processor 120, or memory 130) used to perform operations or functions implemented in other programs (such as the middleware 143, API 145, or application program 147). The kernel 141 may provide an interface that allows the middleware 143, API 145, or application 147 to access the individual components of the electronic device 101 to control or manage the system resources. The middleware 143 may function as a relay to allow the API 145 or the application 147 to communicate data with the kernel 141, for example. A plurality of applications 147 may be provided. The middleware 143 may control work requests received from the applications 147, such as by allocating the priority of using the system resources of the electronic device 101 (such as the bus 110, processor 120, or memory 130) to at least one of the plurality of applications 147. The API 145 is an interface allowing the application 147 to control functions provided from the kernel 141 or the middleware 143. For example, the API 133 may include at least one interface or function (such as a command) for file control, window control, image processing, or text control.

The input/output interface 150 may serve as an interface that may, for example, transfer commands or data input from a user or other external devices to other component(s) of the electronic device 101. Further, the input/output interface 150 may output commands or data received from other component(s) of the electronic device 101 to the user or the other external devices.

The display 160 may include, for example, a liquid crystal display (LCD), a light emitting diode (LED) display, an organic light emitting diode (OLED) display, a microelectromechanical systems (MEMS) display, or an electronic paper display. The display 160 can also be a depth-aware display, such as a multi-focal display. The display 160 may display various contents (such as text, images, videos, icons, or symbols) to the user. The display 160 may include a touchscreen and may receive, for example, a touch, gesture, proximity, or hovering input using an electronic pen or a body portion of the user.

The communication interface 170 may set up communication between the electronic device 101 and an external electronic device (such as a first electronic device 102, a second electronic device 104, or a server 106). For example, the communication interface 170 may be connected with a network 162 or 164 through wireless or wired communication to communicate with the external electronic device.

The first external electronic device 102 or the second external electronic device 104 may be a wearable device or an electronic device 101-mountable wearable device (such as a head mounted display (HMD)). When the electronic device 101 is mounted in an HMD (such as the electronic device 102), the electronic device 101 may detect the mounting in the HMD and operate in a virtual reality mode. When the electronic device 101 is mounted in the electronic device 102 (such as the HMD), the electronic device 101 may communicate with the electronic device 102 through the communication interface 170. The electronic device 101 may be directly connected with the electronic device 102 to communicate with the electronic device 102 without involving with a separate network.

The wireless communication may use at least one of, for example, long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of, for example, universal serial bus (USB), high-definition multimedia interface (HDMI), recommended standard 232 (RS-232), or plain old telephone service (POTS). The network 162 may include at least one communication network, such as a computer network (like a local area network (LAN) or wide area network (WAN)), the Internet, or a telephone network.

The first and second external electronic devices 102 and 104 each may be a device of the same type or a different type from the electronic device 101. According to embodiments of this disclosure, the server 106 may include a group of one or more servers. Also, according to embodiments of this disclosure, all or some of the operations executed on the electronic device 101 may be executed on another or multiple other electronic devices (such as the electronic devices 102 and 104 or server 106). Further, according to embodiments of this disclosure, when the electronic device 101 should perform some function or service automatically or at a request, the electronic device 101, instead of executing the function or service on its own or additionally, may request another device (such as electronic devices 102 and 104 or server 106) to perform at least some functions associated therewith. The other electronic device (such as electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

While FIG. 1 shows that the electronic device 101 includes the communication interface 170 to communicate with the external electronic device 102 or 104 or server 106 via the network(s) 162 and 164, the electronic device 101 may be independently operated without a separate communication function, according to embodiments of this disclosure. Also, note that the electronic device 102 or 104 or the server 106 could be implemented using a bus, a processor, a memory, a I/O interface, a display, a communication interface, and an event processing module (or any suitable subset thereof) in the same or similar manner as shown for the electronic device 101.

The server 106 may operate to drive the electronic device 101 by performing at least one of the operations (or functions) implemented on the electronic device 101. For example, the server 106 may include an event processing server module (not shown) that may support the event processing module 180 implemented in the electronic device 101. The event processing server module may include at least one of the components of the event processing module 180 and perform (or instead perform) at least one of the operations (or functions) conducted by the event processing module 180. The event processing module 180 may process at least part of the information obtained from other elements (such as the processor 120, memory 130, input/output interface 150, or communication interface 170) and may provide the same to the user in various manners.

In some embodiments, the processor 120 or event processing module 180 is configured to communicate with the server 106 to download or stream multimedia content, such as images, video, or sound. For example, a user operating the electronic device 101 can open an application or website to stream multimedia content. The processor 120 (or event processing module 180) can process and present information, via the display 160, to enable a user to search for content, select content, and view content. In response to the selections by the user, the server 106 can provide the content or record the search, selection, and viewing of the content, or both provide and record.

While the event processing module 180 is shown to be a module separate from the processor 120 in FIG. 1, at least a portion of the event processing module 180 may be included or implemented in the processor 120 or at least one other module, or the overall function of the event processing module 180 may be included or implemented in the processor 120 shown or another processor. The event processing module 180 may perform operations according to embodiments of this disclosure in interoperation with at least one program 140 stored in the memory 130.

Although FIG. 1 illustrates one example of a network configuration 100, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2A:
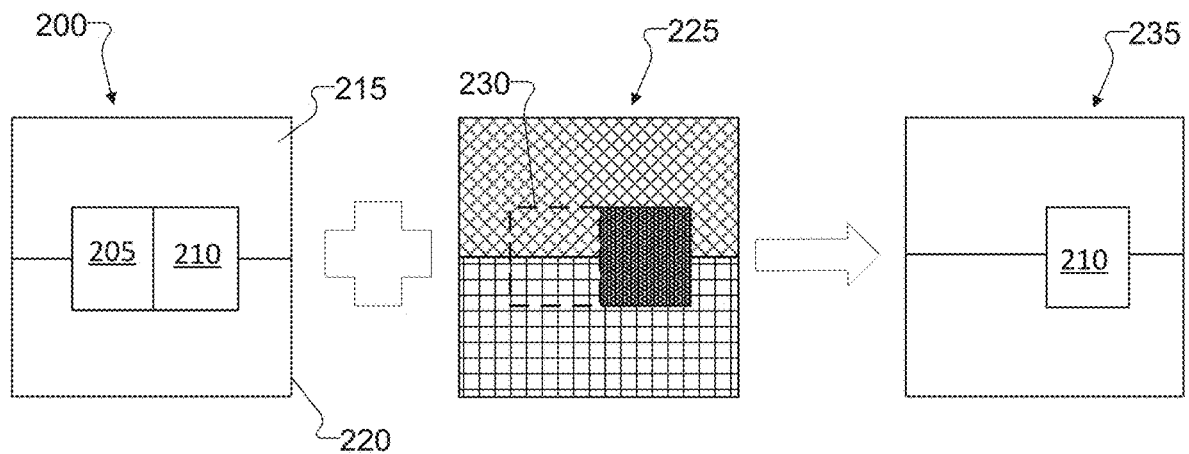
FIGS. 2A and 2B illustrate example layout-guided inpainting processes in accordance with this disclosure.
Figure 2B:
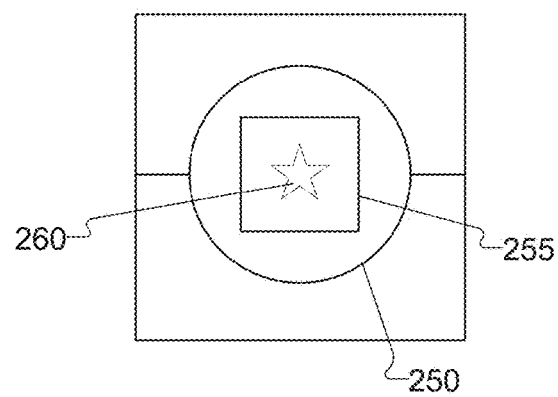

FIGS. 2A and 2B illustrate example layout-guided inpainting processes in accordance with this disclosure. For ease of explanation, the layout-guided inpainting processes may be described as being performed by the electronic device 101 in the network configuration 100 of FIG. 1. However, the layout-guided inpainting processes may be performed by any other suitable device (such as the server 106) and in any other suitable system.

In the example shown in FIG. 2A, a first operation of the inpainting technique involves the use of inputs, namely an input image 200 and a layout mask 225. The input image 200 represents an image in which one or more portions of the image (in this case, one of the square areas) are being removed. Each portion of the input image 200 being removed is often referred to as a "hole" 205. The input image 200 typically includes image data of multiple semantic classes, which (as described above) often makes it difficult for pure CNN-based architectures to generate replacement content for one or more holes 205. In this specific example, the input image 200 is shown as having two regions of different semantic classes (a top region 215 and a bottom region 220), which may be relatively common in scenes such as those with the ground and the sky. The input image 200 also includes regions representing a single area or hole 205 in which image content is being removed and a second object 210 adjacent to the hole 205. Note, however, that this input image 200 is an example only and is merely used to help explain further operations of the inpainting technique.

The second object 210 may be an object having a delicate shape. The delicate shape may be a shape having contoured edges, gradient (soft) transitions, curves, combinations of curves and straight edges, complex edges, and the like. The hole 205 from the first object is adjacent to the second object 210. The hole 205 may be defined as a bad region or target region, and different portions of the bad region may belong to the top region 215 and the bottom region 220.

The layout mask 225 is applied to the image, and the layout mask 225 separates the image plane of the input image 200 into several object categories. The layout mask 225 can be a semantic mask, such as is disclosed in U.S. patent application Ser. No. 16/950,835 (which is hereby incorporated by reference in its entirety). The semantic mask enables the processor 120 to effectively determine what semantic class or classes should be used to fill each hole 205 in the input image 200 being processed, determine how the semantic class(es) should be distributed within each hole 205, and determine what each filled hole 205 should look like. In this example, the categories include categories for the second object 210, the top region 215, and the bottom region 220. A boundary 230 of the hole 205 is depicted in the example shown in FIG. 2A. Each of the regions 215 and 220 of the hole 205 may be inpainted only using non-hole regions of the same object category. By applying the layout mask 225, the image of an ideally-inpainted mixed scene 235 can be estimated in which the hole 205 is perfectly inpainted and the delicate shape of the second object 210 is preserved. That is, the inpainting technique is used to generate image content based on the semantic codes while maintaining the delicate shape of the object 210.

In certain situations, a kernel may be entirely included within a hole left by removing an object. For example, reducing the neural network depth may lead to better efficiency but may cause insufficient receptive field of the convolutional neural network, which makes the neural network fail to inpaint large holes well. In the example shown in FIG. 2B, a circle 250 defines a hole left after removal of an object, while a square 255 represents a convolution kernel and a star 260 represents the kernel center. Because of the insufficient receptive field, there is no valid non-hole regions within the convolution kernel 255 to be used as the contexts for the location of the kernel center 260.

In some embodiments of this disclosure, a mini-painter can be provided, where the mini-painter is configured to operate as an in-painting model. The mini-painter is configured to minimize model storage and computational complexity. The mini-painter uses a contextual correspondence between corrupted regions in an image and contextual regions. Based on the contextual correspondence, the mini-painter includes three sub-models including a contextually-corresponding diffusion model, a refinement model, and a collaborative model. In some embodiments, the refinement model includes a top-X contextual attention mechanism.

Although FIGS. 2A and 2B illustrate examples of layout-guided inpainting processes, various changes may be made to FIGS. 2A and 2B. For example, the sizes and locations of various regions shown in the images of FIGS. 2A and 2B are for illustration only and can vary widely based on the actual images being processed.

Figure 3:
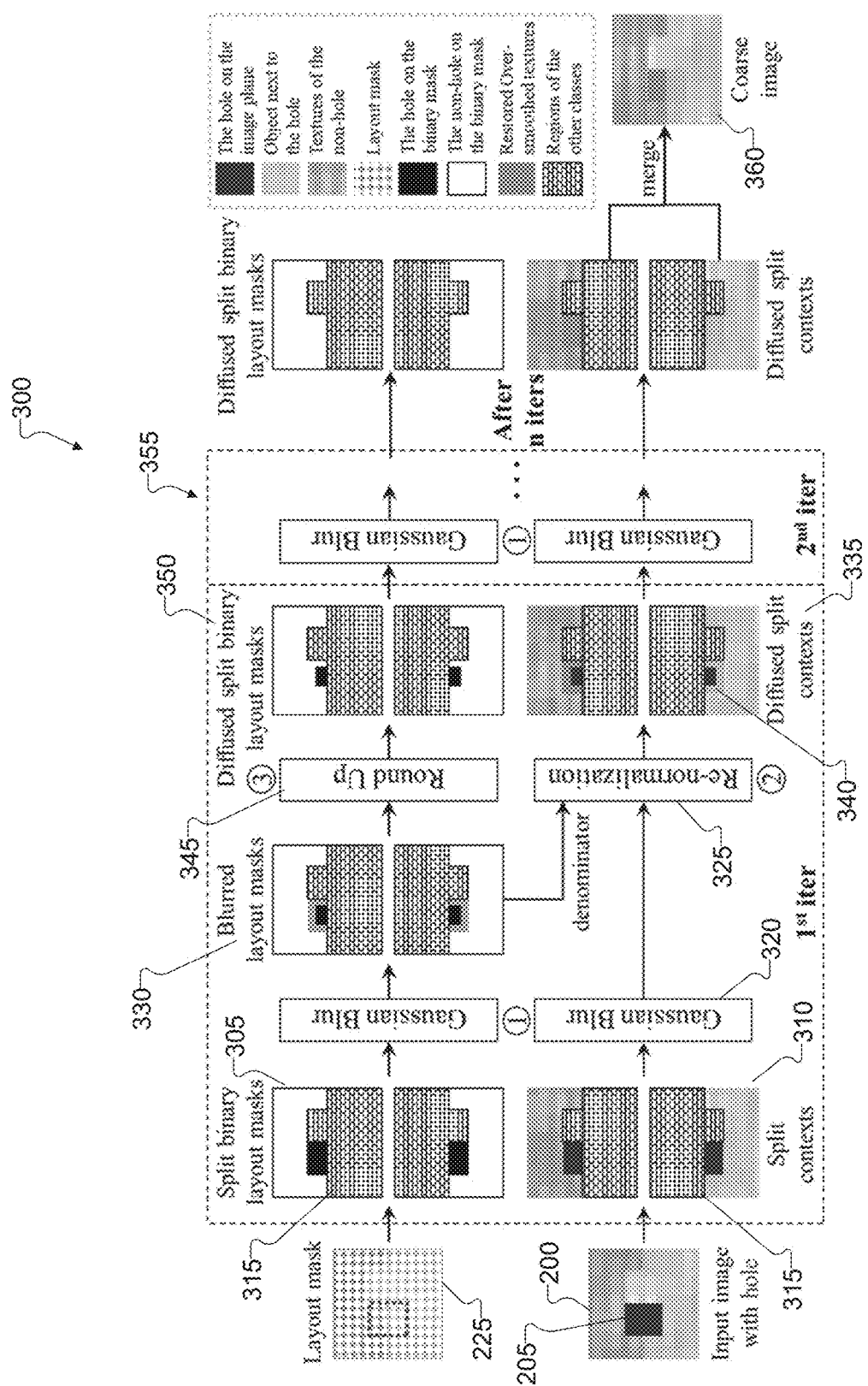
FIG. 3 illustrates an example layout-guided preprocessing model in accordance with this disclosure.

FIG. 3 illustrates an example layout-guided preprocessing model 300 in accordance with this disclosure. For ease of explanation, the layout-guided preprocessing model 300 (which may also be referred to as a contextually corresponding diffusion model) may be described as being used by the electronic device 101 in the network configuration 100 of FIG. 1 while performing a layout-guided inpainting process of FIGS. 2A and 2B. However, the layout-guided preprocessing model 300 may be used by any other suitable device (such as the server 106) and in any other suitable system, and the layout-guided preprocessing model 300 may be used during any other suitable layout-guided inpainting process.

As shown in FIG. 3, the layout-guided preprocessing model 300 is configured to perform an iterative diffusing process including a Gaussian blur and re-normalization until a hole within an image is corrected. The layout-guided preprocessing model 300 can restore coarse textures for hole regions in an efficient nonparametric fashion. Specifically, the processor 120 uses a layout mask to guide the preprocessing model 300 to propagate textures of non-hole regions to hole regions of the same object categories. The iterative pipeline of the layout-guided preprocessing model 300 contains three steps within each iteration, and three semantic classes are marked using different shades here.

In the example shown in FIG. 3, the layout-guided preprocessing model 300 receives the image 200 and the layout mask 225, and the layout-guided preprocessing model 300 applies split binary layout masks to the inputs. The image plane is split according to the object category distribution, and the image plane is split to shield against artifacts brought about by mixing different object categories. The layout mask 225 is split into split binary layout masks 305, and the input image 200 is split into split contexts 310. In the example depicted in FIG. 3, regions 315 that belong to other object categories are marked with brick patterns, which may be fixed to zero constantly throughout the preprocessing process. The split binary layouts represent values 1 and 0, respectively. The gray in the blurred layouts represent values between 0 and 1.

The layout-guided preprocessing model 300 aggregates neighboring contexts as the content for each hole region. On the image plane, the more-distant a contextual non-hole region is to a hole region, the lower impact the non-hole region should have on the hole region. In some embodiments, the distance may be determined as a Euclidean distance. The layout-guided preprocessing model 300 includes a Gaussian Blur module 320 that utilizes a two-dimensional (2D) Gaussian kernel to perform a Gaussian Blur process in step ①. Weights of the 2D Gaussian kernel may follow a 2D Gaussian distribution, with a center placed at the square kernel center. For each hole region, the hole region's contexts can be aggregated by performing the 2D convolution centered on the hole region with the 2D Gaussian kernel. In particular embodiments, the Gaussian Blur can be performed according to:

$$g(W, H) = \frac{1}{\Sigma_i^K \Sigma_j^K W_{i,j}} \Sigma_i^K \Sigma_j^K (W \odot H)_{i,j} \quad (1)$$

In Equation (1), $W \in \mathbb{R}_{>0}^{K \times K}$ represents a 2D Gaussian kernel that has a K×K matrix with each entry being positive, and H represents a K×K slice of an input (namely the split contexts 310 or split binary layout mask 305) centered on a current bad location. Also, $\odot$ denotes the Hadamard product, and g (W, H) represents the Gaussian blur operation that includes two sub-operations (namely the Hadamard product between W and H and the normalization through the division of the Hadamard product by the grand sum of W).

The context aggregation for a specific hole region can be exclusive to only the non-hole regions. However, the normalization operation of the Gaussian blur violates this rule because the normalization operation considers all regions indiscriminately. Therefore, the layout-guided preprocessing model 300 re-normalizes the results of Gaussian blur by eliminating influences from other hole regions. The layout-guided preprocessing model 300 includes a re-normalization module 325, and the layout-guided preprocessing model 300 receives the blurred layout masks 330 output by Gaussian Blur module 320 as the denominator for the re-normalization in step ②. In particular embodiments, the aggregation results may be constructed according to:

$$\Omega = \{i, j | H_{i,j}^S = 1\} \quad (2)$$

The blurred structure can be computed by inserting $H^S$ into Equation (1), removing the expression in the Hadamard product operation involving $H_{i,j}^S = 0$, and reducing the expression in the Hadamard product operation involving $H_{i,j}^S = 1$. This can be expressed as follows:

$$g(W, H^S) = \frac{1}{\Sigma_i^K \Sigma_j^K W_{i,j}} \Sigma_{i,j \in \Omega} W_{i,j} \quad (3)$$

The re-normalized aggregation result h' for a specific bad region (hole) can be computed by dividing the result of Equation (1) by the result of Equation (3). This can be expressed as follows:

$$h' = \frac{1}{\Sigma_{i,j \in \Omega} W_{i,j}} \Sigma_i^K \Sigma_j^K (W \odot H)_{i,j} \quad (4)$$

The aggregation results constitute the diffused split contexts 335.

As shown in the example of FIG. 3, in the diffused split contexts 330, a portion of the hole 205 is corrected or blurred 340 into the rest of the image 205. The corrected or blurred portion of the image 205 may not correct the entire hole 205. Therefore, the layout-guided preprocessing model 300 is configured to repeat the Gaussian blur and renormalization until the entire hole 205 is corrected.

The layout-guided preprocessing model 300 further includes a round up module 345 configured to generate diffused split binary layout masks 350. In step ③, the blurred layout masks 330 can be rounded up to generate the diffused split binary layout masks 350. The diffused split contexts 335 and the diffused split binary layout masks 350 are provided to the next iteration 355 of the process as inputs. After several iterations, all coarse textures can be restored in the diffused split contexts 335', which is merged to form a coarse image 360.

Although FIG. 3 illustrates one example of a layout-guided preprocessing model 300, various changes may be made to FIG. 3. For example, the actual contents of the contexts and masks can vary widely based on the contents of the images being processed.

Figure 4:
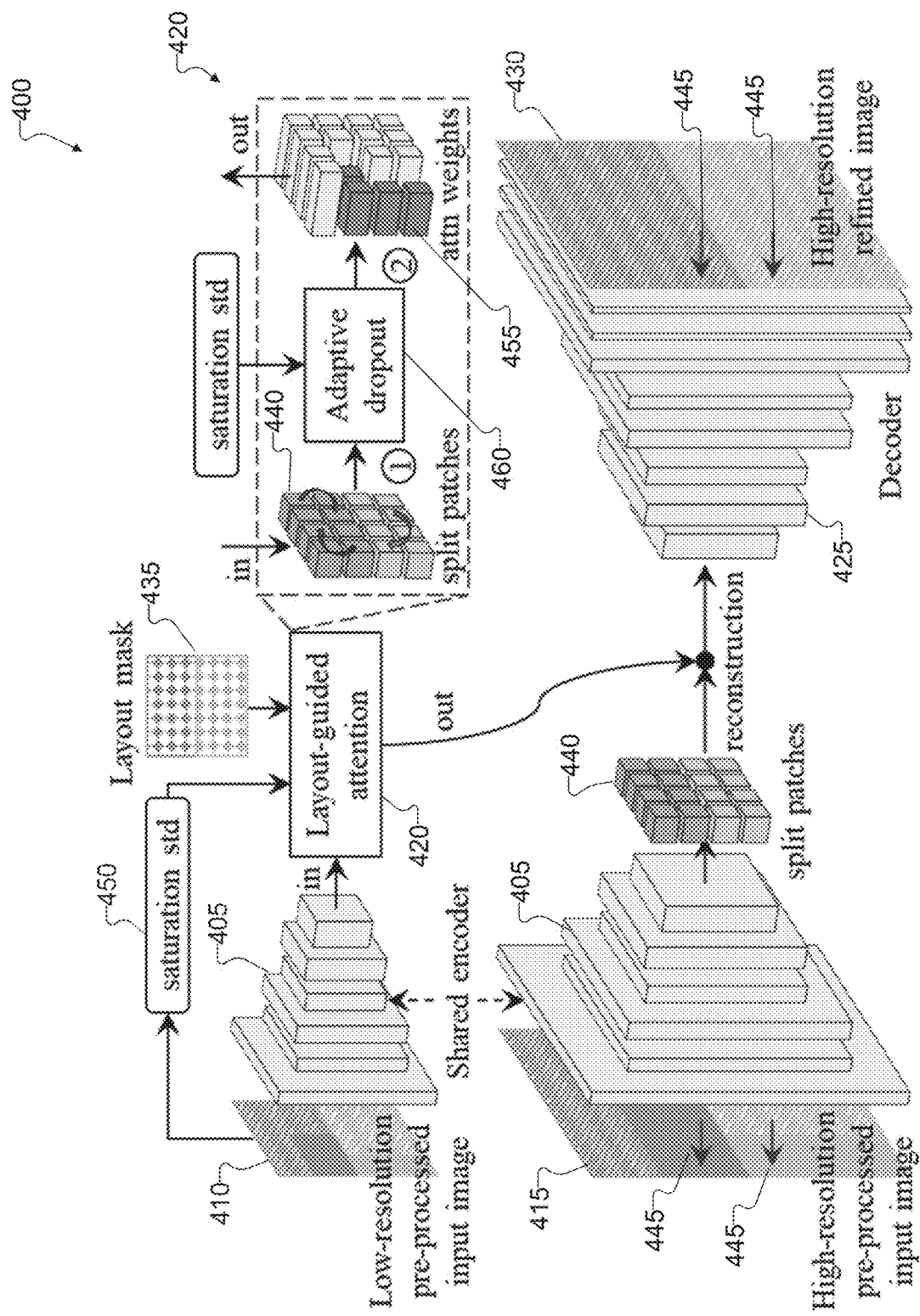
FIG. 4 illustrates an example layout-guided refinement model in accordance with this disclosure.

FIG. 4 illustrates an example layout-guided refinement model 400 in accordance with this disclosure. For ease of explanation, the layout-guided refinement model 400 may be described as being used by the electronic device 101 in the network configuration 100 of FIG. 1 while performing a layout-guided inpainting process of FIGS. 2A and 2B. However, the layout-guided refinement model 400 may be used by any other suitable device (such as the server 106) and in any other suitable system, and the layout-guided refinement model 400 may be used during any other suitable layout-guided inpainting process.

Given a coarse image restored by the layout-guided preprocessing model 300 as an input, the refinement model 400 is used to refine the coarse textures. In the example shown in FIG. 4, the processor 120 is configured to execute or operate the refinement model 400 with layout-guided attention. The refinement model 400 includes three components: (i) a shared encoder 405 for encoding a low-resolution (LR) coarse image 410 and a high-resolution (HR) coarse image 415; (ii) a layout-guided attention module 420 for aggregating the contents for each region; and (iii) a decoder 425 for reconstructing textures of the good regions and restoring textures of the bad regions. The decoder 425 outputs an HR refined image 430. Overall, the image decoder 425 here operates to precisely apply extracted semantic codes in order to reconstruct image data in the output refined image 430.

Two object categories are illustrated in this example by different shading in each of multiple images 410, 415, 430, a layout mask 435, and split patches 440. The layout-guided attention module 420 is also referenced as a "top-X contextual attention module." The refinement model 400 is configured to receive HR and LR copies of the same image. That is, the refinement model 400 receives the HR coarse image 415 and the LR coarse image 410. As each image is a different resolution version of the same image, each image includes restored hole regions 445, which can be observed via the over-smoothed textures that are restored by the layout-guided preprocessing model 300 on the pre-processed input HR coarse image 415 and the normal textures on the high-resolution refined image 430.

The shared encoder 405 and decoder 425 are configured to operate as a convolutional network. The shared encoder 405 outputs split patches 440 of the respective image input into the shared encoder 405. An attention estimation can be performed at low resolution, which would save computation costs. Thus, in this particular example, the layout-guided attention module 420 is applied only to the LR coarse image 410. The layout-guided attention module 420 receives a saturation standard 450 and layout mask 435.

Certain contextual attention mechanisms may be configured to recover information of bad regions through a contextual aggregation that aggregates and projects information of good regions to the bad regions according to estimated patch similarities. In some embodiments, for example, given the $i^{th}$ patch and the $j^{th}$ patch on an image plane, a cosine similarity $c_{i,j}$ can be computed according to:

$$c_{i,j} = \frac{p_i \cdot p_j}{\|p_i\| \times \|p_j\|} \tag{5}$$

In Equation (5), $p_i$ and $p_j$ respectively denote features of the $i^{th}$ and $j^{th}$ patches. The attention weight $S_{i,j}$ can be calculated according to:

$$S_{i,j} = \frac{\exp(\alpha \times c_{i,j})}{\sum_k^N \exp(\alpha \times c_{i,k})} \tag{6}$$

In Equation (6), $\alpha$ is a hyperparameter that enlarges the range of cosine similarity and increases the attention applied to the relevant patches. In certain examples, $\alpha$ can be set to 10.

Note that these contextual attention mechanisms may not be able to exclude influences from contexts of other object structures because the estimated attention weights may not have a high enough accuracy. The inability to exclude these influences can cause ambiguity artifacts. Additionally, for an image with uniform saturation, textures of bad regions may look similar and result in aggregated contexts also appearing similar, and the low diversity of the similar aggregated contexts can cause repetitive grid artifacts. The layout-guided attention module 420, which is a top-X contextual attention mechanism, overcomes the inabilities of the certain contextual attention mechanisms. The layout-guided attention module 420 can exclude influences from contexts of other object structures and overcome the lack of diversity by adaptively selecting top-ranked contexts for reconstruction. Accordingly, the layout-guided attention module 420 can resolve ambiguity artifacts and grid artifacts effectively.

The layout-guided attention module 420 is configured to overcome the two drawbacks of the contextual attention mechanisms. Specifically, the layout-guided attention module 420 randomly samples a certain number of top-ranked relevant contexts to aggregate for each region.

Although FIG. 4 illustrates one example of a layout-guided refinement model 400, various changes may be made to FIG. 4. For example, the actual contents of the images, masks, and patches can vary widely based on the contents of the images being processed.

Figures 5A, 5C, 5E:
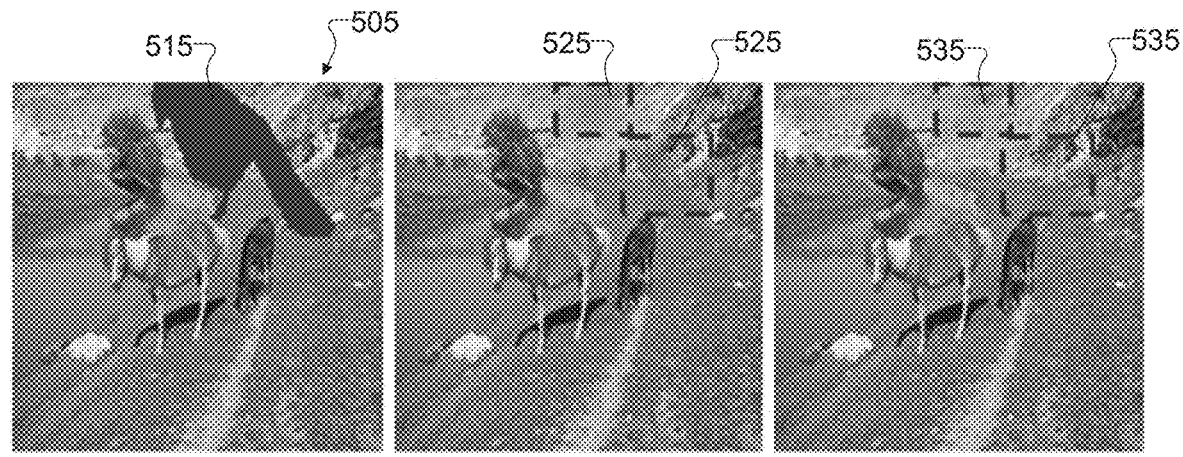
FIGS. 5A-5F illustrate example results of images processed through various attention mechanisms in accordance with this disclosure.
Figures 5B, 5D, 5F:
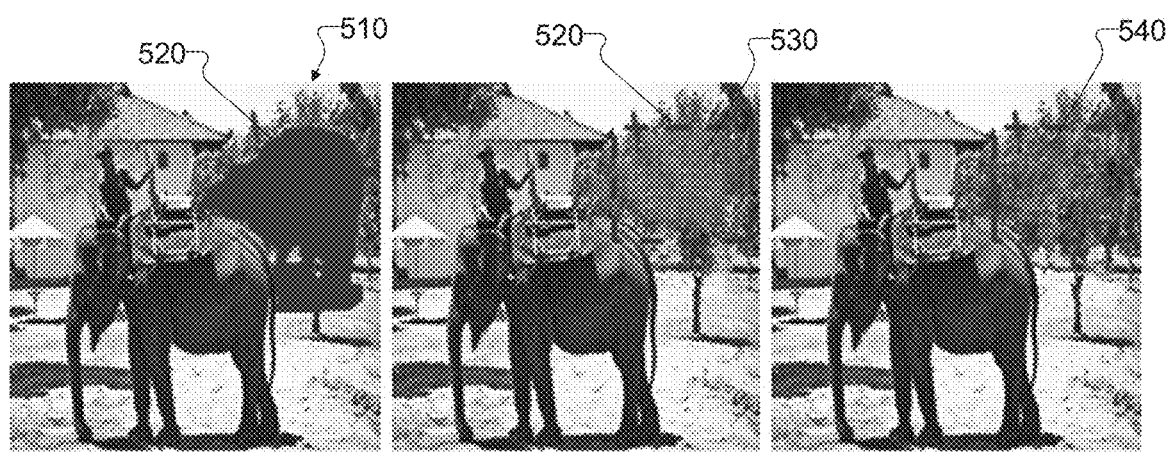

FIGS. 5A-5F illustrate example results of images processed through various attention mechanisms in accordance with this disclosure. The examples shown in FIGS. 5A and 5B depict images 505 and 510 having respective hole regions 515 and 520. As shown in the examples of FIGS. 5C and 5D, ambiguity artifacts 525 and grid artifacts 530 are caused by the contextual attention.

The layout-guided attention module 420 operates in two steps. In step ①, split patches of the LR coarse image processed and output from the shared encoder 405 are processed to compute layout-guided attention weights, as illustrated by the curved arrows pointing from and to the same object category. In step ②, attention weights are applied to the adaptive dropout of the computed attention weights based on the saturation standard deviation computed from the input image. The dropout regions 435 of the attention weights are generated based on the adaptive dropout.

In some embodiments, in step ①  performed by the layout-guided attention module 420, the processor 120 computes a layout-guided attention weight as a contextually corresponding attention weight according to:

$$S_{i,j}^X = \frac{\delta(o_i = o_j)\exp(\alpha \times c_{i,j})}{\Sigma_k^N \delta(o_i = o_j)\exp(\alpha \times c_{i,k})} \quad (7)$$

In Equation (7), $o_i$ denotes the index of the object structure to which the $i^{th}$ patch belongs, and $\delta(\cdot)$ is a delta function that outputs "1" when the condition is true and outputs "0" when the condition is not true. Only the patches 440 of the same object category, which are usually top-ranked, are considered to be the valid contexts. Accordingly, the processor 120 can exclude the negative influences from the contexts belonging to the other object categories and produce a refined image having restored regions 535 in the image 505 as shown in the example illustrated in FIG. 5E.

In some embodiments, in step ②, the processor 120 can resolve the grid artifacts 530 by randomly sampling the top-ranked contexts for each hole region 520. The layout-guided attention module 420 can avoid grid artifacts 530 by improving the diversity in the context aggregation for different regions. In particular embodiments, the layout-guided attention module 420 includes an adaptive dropout. As illustrated in the dotted box in FIG. 4, the attention weights 455 (shaded) for hole regions 520 are processed by the adaptive dropout module 460, and the number of such attention weights can become fewer (shorter in length) than those attention weights for the non-hole regions. The dropout rate can be determined adaptively, such as according to the appearance similarities among hole regions. Intuitively, the higher appearance the similarities are, the higher the dropout rate is desired to ensure the diversity in the context aggregation. In some cases, the standard deviation of the color saturation reflects the appearance dissimilarity properly. Therefore, a formula to estimate the dropout rate for an image based on its standard deviation of the saturation can be expressed as follows:

$$\text{rate}=\min(\max((-\text{std}+\beta)\cdot\gamma, 0), 0.9) \quad (8)$$

In Equation (8), $\beta$ and $\gamma$ denote the bias and slope, respectively. In some cases, $\beta=80$ and $\gamma=0.008$. The min and max functions clip the dropout rate to a specified range, such as [0, 0.9]. Accordingly, the processor 120 can correct for potential grid repetition artifacts and produce a refined image having restored regions 540 in the image 510 as shown in the example illustrated in FIG. 5E.

The small capacity of the refinement model 400 may require low storage and low computational costs, but this may also make it difficult to achieve high-fidelity results. In some embodiments, a low-cost collaborative calibration model is utilized to calibrate the refined image output by the refinement model 400. The collaborative calibration model may operate on two principles. According to the first principle, in the refined image output by the refinement model 400, the reconstructed textures of good regions and the restored textures of bad regions can appear harmonious and seamless to each other. The first principle is maintained by smoothing functionality provided by the convolutional operations in the refinement model 400. According to the second principle, given the contextual residuals between the reconstructed textures and the original textures of good regions, the residuals between the resorted textures and ideal textures of bad regions can be inpainted. Based on the second principle, a collaborative calibration model calibrates the restored textures of bad regions by adding the inpainted residuals to the restored textures of the bad regions. The collaborative calibration model does not introduce new parameters and does not contribute to the storage costs. The computational costs derive from the contextual aggregation over the three-channel residuals, which is low.

Although FIGS. 5A-5F illustrate examples of results of images processed through various attention mechanisms, various changes may be made to FIGS. 5A-5F. For example, the results shown here are merely meant to illustrate examples of the types of results that may be obtained using the approaches described in this patent document. Different results may be obtained using different images or different implementations of the inpainting techniques.

Figure 6A:
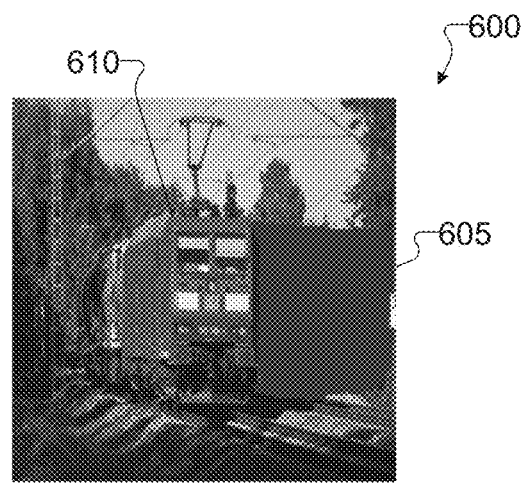
FIGS. 6A-6C illustrate example results using a depth mask in accordance with this disclosure.
Figure 6B:
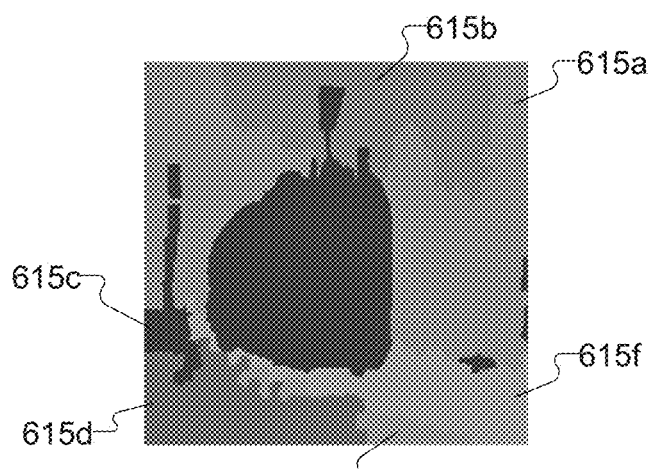
Figure 6C:
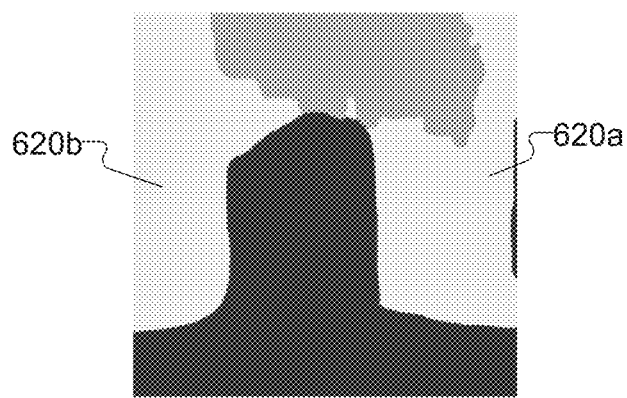

FIGS. 6A-6C illustrate example results using a depth mask in accordance with this disclosure. As shown in FIG. 6A, in an input image 600, a hole region 605 is created by removal of an object adjacent to another object 610 having a delicate shape. In the example shown in FIG. 6B, a layout mask is applied to the input image 600. The layout mask separates the image plane into several object categories 615a-615f. The hole regions of a specific object category can only be inpainted using non-hole regions of the same object category as contexts.

In some embodiments, a depth mask is used in place of the layout mask. A depth mask separates the image plane into several depth layers. In some cases, the depth mask can be obtained by clustering the values in the depth maps into several clusters. The hole regions of a specific depth layer 620a may only be inpainted using non-hole regions of the same depth layer 620b as contexts. Also, in some embodiments, the depth mask is used in place of the layout mask in the layout-guided preprocessing model 300 uses and the layout-guided refinement model 400. The results of this approach are shown in FIG. 6C.

Although FIGS. 6A-6C illustrate examples of results using a depth mask, various changes may be made to FIGS. 6A-6C. For example, the results shown here are merely meant to illustrate examples of the types of results that may be obtained using the approaches described in this patent document. Different results may be obtained using different images or different implementations of the inpainting techniques.

Figure 7:
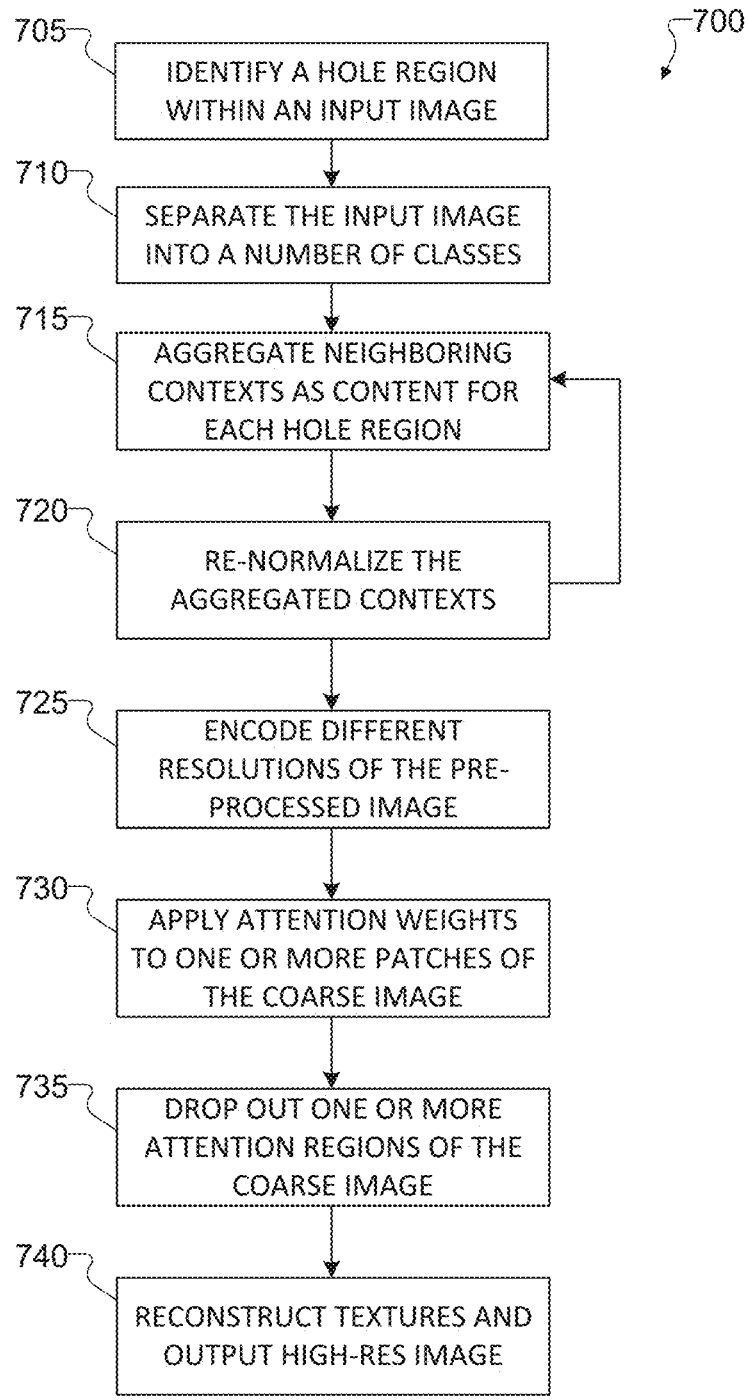
FIG. 7 illustrates an example process for layout-guided inpainting in accordance with this disclosure.

FIG. 7 illustrates an example process 700 for layout-guided inpainting in accordance with this disclosure. While FIG. 7 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 700 depicted can be implemented by one or more processors in an image processing system, such as by one or more processors 120 of an electronic device 101 or server 106. In some embodiments, one or more steps of the process 700 are performed by one or more processors in an electronic device or server performing a machine learning (i.e., an artificial intelligence) process.

In operation 705, an image processing system identifies a hole region or bad region within an input image. The hole region may be the result of an object that was removed from the image. In operation 710, the input image is separated into multiple classes or categories. In order to shield against the artifacts brought by mixing different object categories, the image plane can be separated by an object category distribution.

In operation 715, the image processing system aggregates neighboring contexts as the content for each hole region. On the image plane, the more distant a contextual non-hole region is to a hole region, the lower impact the non-hole region should have on the hole region. In some embodiments, the weights of a 2D Gaussian kernel follow a 2D Gaussian distribution with the center placed at the square kernel center. A Gaussian blur is performed in which the contexts of each hole region are aggregated by performing the 2D convolution centered on the hole region with the 2D Gaussian kernel. In operation 720, the image processing system re-normalizes the aggregated contents. The image processing system re-normalizes the results of Gaussian blur by eliminating influences from other hole regions. An output of the re-normalization process is reprocessed in operation 715 until the hole region is eliminated and the pre-processed image produced.

In operation 725, once the hole region is eliminated, the image processing system encodes high and low resolutions of the pre-processed image. Encoding the different resolutions yields coarse images. A layout-guided attention module aggregates the contexts for each region by applying attention weights to different patches of the coarse image in operation 730. The layout-guided attention module also performs an adaptive dropout of the computed attention weights based on the saturation standard deviation computed from the input image in operation 735. In operation 740, a decoder reconstructs textures of the non-hole regions and restores those of the hole regions, and the decoder outputs the high-resolution refined image.

While the above detailed diagrams have shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention.

Although this disclosure has been described with example embodiments, various changes and modifications may be suggested to one skilled in the art. It is intended that this disclosure encompass such changes and modifications as fall within the scope of the appended claims.

What is claimed is:

1. An electronic device comprising:
a display; and
at least one processor configured to:
obtain an image including an object having a delicate shape;
identify a target region within the image, the target region adjacent to the object;
use a mask to separate the image into multiple semantic categories each associated with a different type or class of image data captured in the image;
aggregate neighboring contexts for the target region based on the semantic categories;
restore, based on the aggregated contexts, textures in the target region without affecting the delicate shape of the object; and
cause the display to display a refined image including the restored textures in the target region and the object;
wherein, to aggregate the neighboring contexts for the target region, the at least one processor is configured to:
split the image into multiple split contexts based on at least two of the semantic categories;
split the mask into multiple split binary layout masks based on the at least two sematic categories; and
apply a Gaussian blur to the split contexts and the split binary layout masks using a two-dimensional (2D) Gaussian kernel configured to perform a 2D convolution.

2. An electronic device comprising:
a display; and
at least one processor configured to:
obtain an image including an object having a delicate shape;
identify a target region within the image, the target region adjacent to the object;
use a first mask to separate the image into a number of semantic categories;
aggregate neighboring contexts for the target region based on the semantic categories;
restore, based on the aggregated contexts, textures in the target region without affecting the delicate shape of the object; and
cause the display to display a refined image including the restored textures in the target region and the object;
wherein, to restore the textures in the target region, the at least one processor is configured to:
re-normalize the aggregated contexts to produce a pre-processed image;
encode different resolution versions of the pre-processed image to produce coarse images of the different resolution versions;
apply a guided attention to a first of the coarse images;
combine the first coarse image with a second of the coarse images to produce a combined coarse image; and
decode the combined coarse image to produce the refined image.

3. The electronic device of claim 2, wherein, to re-normalize the aggregated contexts to produce the pre-processed image, the at least one processor is configured to use a blurred out mask to produce diffused split contexts of the image.

4. The electronic device of claim 3, wherein the at least one processor is configured to repeat the aggregation and re-normalization on the diffused split contexts of the image.

5. The electronic device of claim 2, wherein:
to encode the different resolution versions of the pre-processed image, the at least one processor is configured to encode a low-resolution version of the pre-processed image and encode a high-resolution version of the pre-processed image;
the at least one processor is configured to encode the low-resolution version of the pre-processed image in order to generate the first coarse image; and
to apply the guided attention to the first coarse image, the at least one processor is configured to:
compute attention guided layout weights for one or more patches in the first coarse image; and
apply an adaptive dropout of the computed attention weights based on a saturated standard deviation computed from the image and a second mask applied to the image, wherein the second mask comprises one of a layout mask or a depth mask.

6. The electronic device of claim 1, wherein, to aggregate the neighboring contexts for the target region, the at least one processor is further configured to repeatedly apply the Gaussian blur using the 2D Gaussian kernel until the target region is eliminated.

7. The electronic device of claim 1, wherein the mask is one of a layout mask or a depth mask.

8. An inpainting method comprising:
obtaining an image including an object having a delicate shape;
identifying a target region within the image, the target region adjacent to the object;
using a mask to separate the image into multiple semantic categories each associated with a different type or class of image data captured in the image;
aggregating neighboring contexts for the target region based on the semantic categories;
restoring, based on the aggregated contexts, textures in the target region without affecting the delicate shape of the object; and
displaying a refined image including the restored textures in the target region and the object;
wherein aggregating the neighboring contexts for the target region comprises:
splitting the image into multiple split contexts based on at least two of the semantic categories;
splitting the mask into multiple split binary layout masks based on the at least two sematic categories; and
applying a Gaussian blur to the split contexts and the split binary layout masks using a two-dimensional (2D) Gaussian kernel configured to perform a 2D convolution.

9. An inpainting method comprising:
obtaining an image including an object having a delicate shape;
identifying a target region within the image, the target region adjacent to the object;
using a first mask to separate the image into multiple semantic categories each associated with a different type or class of image data captured in the image;
aggregating neighboring contexts for the target region based on the semantic categories;
restoring, based on the aggregated contexts, textures in the target region without affecting the delicate shape of the object; and
displaying a refined image including the restored textures in the target region and the object;
wherein restoring the textures comprises:
re-normalizing the aggregated contexts to produce a pre-processed image;
encoding different resolution versions of the pre-processed image to produce coarse images of the different resolution versions;
applying a guided attention to a first of the coarse images;
combining the first coarse image with a second of the coarse images to produce a combined coarse image; and
decoding the combined coarse image to produce the refined image.

10. The method of claim 9, wherein re-normalizing the aggregated contexts to produce the pre-processed image comprises using a blurred out mask to produce diffused split contexts of the image.

11. The method of claim 10, further comprising:
repeating the aggregation and re-normalization on the diffused split contexts of the image.

12. The method of claim 9, wherein:
encoding the different resolution versions of the pre-processed image comprises encoding a low-resolution version of the pre-processed image and encoding a high-resolution version of the pre-processed image;
the first coarse image is generated by encoding the low-resolution version of the pre-processed image; and
applying the guided attention to the first coarse image comprises:
computing attention guided layout weights for one or more patches in the first coarse image; and
applying an adaptive dropout of the computed attention weights based on a saturated standard deviation computed from the image and a second mask applied to the image, wherein the second mask comprises one of a layout mask or a depth mask.

13. The method of claim 8, wherein aggregating the neighboring contexts for the target region further comprises:
repeatedly applying the Gaussian blur using the 2D Gaussian kernel until the target region is eliminated.

14. The method of claim 8, wherein the mask is one of a layout mask or a depth mask.

15. A non-transitory machine-readable medium containing instructions that, when executed by at least one processor of an electronic device, cause the at least one processor to:
obtain an image including an object having a delicate shape;
identify a target region within the image, the target region adjacent to the object;
use a mask to separate the image into multiple semantic categories each associated with a different type or class of image data captured in the image;
aggregate neighboring contexts for the target region based on the semantic categories;
restore, based on the aggregated contexts, textures in the target region without affecting the delicate shape of the object; and
display a refined image including the restored textures in the target region and the object;
wherein the instructions that when executed cause the at least one processor to aggregate the neighboring contexts for the target region comprise instructions that when executed cause the at least one processor to:
split the image into multiple split contexts based on at least two of the semantic categories;
split the mask into multiple split binary layout masks based on the at least two sematic categories; and
apply a Gaussian blur to the split contexts and the split binary layout masks using a two-dimensional (2D) Gaussian kernel configured to perform a 2D convolution.

16. A non-transitory machine-readable medium containing instructions that, when executed by at least one processor of an electronic device, cause the at least one processor to:
obtain an image including an object having a delicate shape;
identify a target region within the image, the target region adjacent to the object;
use a first mask to separate the image into multiple semantic categories each associated with a different type or class of image data captured in the image;
aggregate neighboring contexts for the target region based on the semantic categories;
restore, based on the aggregated contexts, textures in the target region without affecting the delicate shape of the object; and display a refined image including the restored textures in the target region and the object;
wherein the instructions that when executed cause the at least one processor to restore the textures in the target region comprise instructions that when executed cause the at least one processor to:
  re-normalize the aggregated contexts to produce a pre-processed image;
  encode different resolution versions of the pre-processed image to produce coarse images of the different resolution versions;
  apply a guided attention to a first of the coarse images;
  combine the first coarse image with a second of the coarse images to produce a combined coarse image; and
  decode the combined coarse image to produce the refined image.

17. The non-transitory machine-readable medium of claim 16, wherein the instructions that when executed cause the at least one processor to re-normalize the aggregated contexts to produce the pre-processed image comprise:
  instructions that when executed cause the at least one processor to use a blurred out mask to produce diffused split contexts of the image.

18. The non-transitory machine-readable medium of claim 17, wherein the instructions when executed cause the at least one processor to repeat the aggregation and re-normalization on the diffused split contexts of the image.

19. The non-transitory machine-readable medium of claim 16, wherein:
  the instructions that when executed cause the at least one processor to encode the different resolution versions of the pre-processed image comprise instructions that when executed cause the at least one processor to:
    encode a low-resolution version of the pre-processed image to generate the first coarse image; and
    encode a high-resolution version of the pre-processed image; and
  the instructions that when executed cause the at least one processor to apply the guided attention to the first coarse image comprise instructions that when executed cause the at least one processor to:
    compute attention guided layout weights for one or more patches in the first coarse image; and
    apply an adaptive dropout of the computed attention weights based on a saturated standard deviation computed from the image and a second mask applied to the image, wherein the second mask comprises one of a layout mask or a depth mask.

20. The non-transitory machine-readable medium of claim 15, wherein the instructions that when executed cause the at least one processor to aggregate the neighboring contexts for the target region further comprise:
  instructions that when executed cause the at least one processor to repeatedly apply the Gaussian blur using the 2D Gaussian kernel until the target region is eliminated.

* * * * *